United States Patent
Wesley

(10) Patent No.: US 6,499,548 B2
(45) Date of Patent: *Dec. 31, 2002

(54) POWER TAKE-OFF EXTENDED SHAFT

(75) Inventor: Larry E. Wesley, Springport, IN (US)

(73) Assignee: Muncie Power Products, Inc., Muncie, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/908,498

(22) Filed: Jul. 19, 2001

(65) Prior Publication Data

US 2002/0011125 A1 Jan. 31, 2002

Related U.S. Application Data

(63) Continuation-in-part of application No. 09/435,819, filed on Nov. 8, 1999, now Pat. No. 6,263,749.

(51) Int. Cl.⁷ .......................... B60K 17/28; F16H 37/00
(52) U.S. Cl. ..................... 180/53.1; 464/178; 74/11; 74/15.6; 74/15.8
(58) Field of Search ................ 74/11, 13.1, 15.6, 74/15.69, 15.8; 184/84, 103.1; 180/53.1, 339; 464/170, 178

(56) References Cited

U.S. PATENT DOCUMENTS

| | | |
|---|---|---|
| 1,190,804 A | 7/1916 | Scaife |
| 1,194,994 A | 8/1916 | Gramm |
| 1,446,326 A | 2/1923 | Asprooth |
| 1,456,201 A | 5/1923 | Vincent |
| 1,533,531 A | 4/1925 | White |
| 1,589,093 A | 6/1926 | Barrett |
| 2,100,677 A | 11/1937 | Wagner |
| 2,103,971 A | 12/1937 | Goldsmith |
| 2,232,992 A | 2/1941 | Alexander |
| 2,971,386 A | 2/1961 | Lippke |
| 3,039,317 A | 6/1962 | Wilson |
| 3,982,442 A | 9/1976 | Fitch |
| 4,026,124 A | 5/1977 | Toyokuni et al. |
| 4,118,951 A | 10/1978 | Neasham |
| 4,425,817 A | 1/1984 | Wells et al. |
| 4,430,905 A | 2/1984 | Bruguera |
| 4,487,020 A * | 12/1984 | Dineen .......................... 60/521 |
| 4,618,016 A | 10/1986 | van der Lely |
| 4,744,436 A | 5/1988 | Uchiyama |
| 5,070,982 A | 12/1991 | Pitchford |
| 5,228,355 A | 7/1993 | Smith et al. |
| 5,383,374 A | 1/1995 | Reynolds |
| 5,400,862 A | 3/1995 | Behlke |
| 5,439,306 A | 8/1995 | Lhernould |
| 5,759,128 A * | 6/1998 | Mizutani et al. ............ 425/149 |
| 5,808,369 A * | 9/1998 | Whelan ........................ 290/55 |
| 6,263,749 B1 * | 7/2001 | Wesley .......................... 74/11 |

* cited by examiner

Primary Examiner—Kevin Hurley
Assistant Examiner—Matthew Luby
(74) Attorney, Agent, or Firm—Hall, Priddy, Myers & Vande Sande

(57) ABSTRACT

An extended shaft for connecting a standard, transmission mounted power take-off device to an auxiliary device which permits non-interference mounting configurations of the auxiliary device to the power take-off device. The extended shaft further provides mounting bracketry to prevent stresses when thermal expansion or contraction of relevant parts occurs during the operation of the motor vehicle or power take-off device.

6 Claims, 4 Drawing Sheets

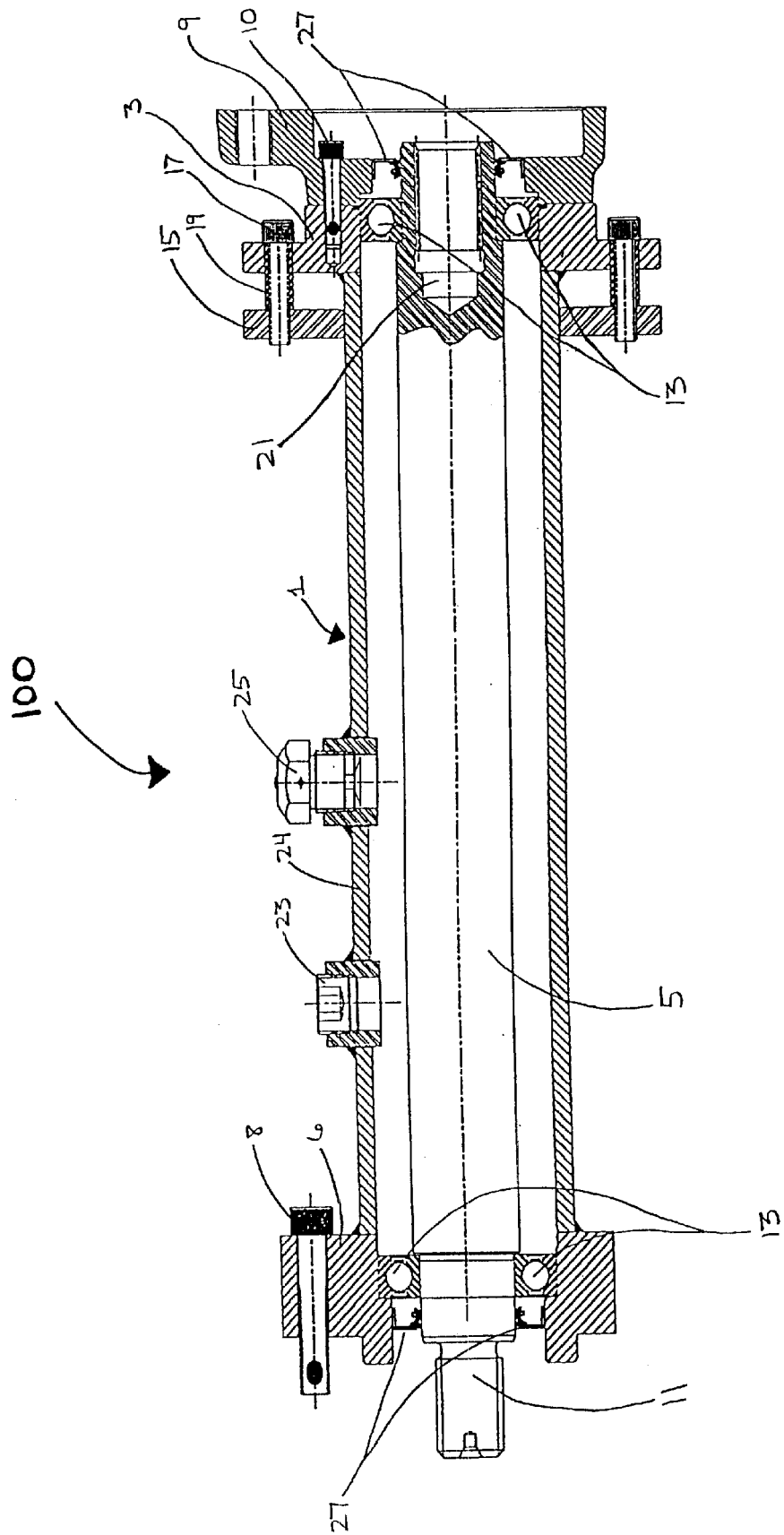

POWER TAKE-OFF EXTENDED SHAFT

CROSS REFERENCE TO RELATED APPLICATIONS

This application is a Continuation-in-Part of U.S. patent application Ser. No. 09/435,819, filed Nov. 8, 1999, now U.S. Pat. No. 6,263,749, the entirety of which is hereby incorporated by reference.

FIELD OF THE INVENTION

This invention relates to an extended shaft for connecting a standard, transmission mounted power take-off device to an auxiliary device, which permits non-interference mounting configurations of the auxiliary device to a power take-off device. The invention further provides mounting bracketry to prevent stresses when thermal expansion or contraction of relevant parts occurs during the operation of the motor vehicle or power take-off device.

BACKGROUND OF THE INVENTION

Power take-off devices are ubiquitously employed throughout the trucking industry to power auxiliary devices. For example, power take-off devices are often used to provide power to hydraulic pumps which in turn provide hydraulic fluid to cylinders which perform auxiliary operations associated with the vehicle (e.g. raise and lower a dump bed, operate a garbage compactor and the like).

In certain situations, power take-off devices are not employed. Rather, the hydraulic pump (or other auxiliary device) is directly driven by the crankshaft of the vehicle's engine. More specifically, a driveshaft assembly is employed to connect the input shaft of the hydraulic pump to the crank shaft of the engine, thereby providing power to the hydraulic pump as the engine is operated. This type of arrangement generally requires that the hydraulic pump be placed at the front end of the vehicle. This creates one or a combination of problems. For example, when mounted in this front location, the front bumper of the vehicle oftentimes must be extended to accommodate the usually large pumps. Further, the radiators in such equipped vehicles frequently need to be cored or relocated to accommodate the mounting position of the hydraulic pump, a practice which may soon be prohibited by a new Environmental Protection Agency emissions law taking effect in the year 2002. In particular, this can result in restricted or reduced airflow to the radiator.

Other problems arise in equipping motor vehicles with hydraulic pumps because certain hydraulic pumps are of such a design that it is not possible to directly mount them to a standard power take-off device. For example, hydraulic pumps used in certain applications must be so large or heavy as to frustrate the plausibility of directly mounting them to a standard power take-off device because to do so would impart too much stress on the mounting areas. In other instances the large size of the hydraulic pump prohibits it from fitting into the envelope (space) that would otherwise be conveniently available for its use.

In view of the above, it is apparent that there exists a need in the art for an extended shaft capable of operably coupling to both a power take-off device and to an auxiliary device which overcomes the above drawbacks. It is a purpose of this invention to fulfill this need in the art, as well as other needs which will become apparent to the skilled artisan once given the following disclosure.

SUMMARY OF THE INVENTION

Generally speaking, this invention fulfills the above described needs in the art by providing: in the combination of an engine which operates a work performing mechanism remotely located from the engine wherein the combination includes a transmission operatively connected to the engine and to the work performing mechanism by a power takeoff device connected to the transmission and having a housing and an output shaft connectable to the work performing mechanism for operating the mechanism in a work performing mode, the improvement wherein the combination further includes an extension mechanism for remotely mounting the work performing mechanism a preselected spaced distance from the power takeoff device, the extension mechanism comprising a housing extending across the preselected spaced distance and being connected to the transmission and to the housing of the power takeoff device and further including a shaft located and internally rotatably supported via sealed, lubricated bearings within the housing and extending across the preselected spaced distance from the power takeoff device to the work performing mechanism and being connected at a first end to the output shaft of the power takeoff device and at a second end to the work performing mechanism, whereby when the power takeoff device is operatively connected to the transmission and the engine is operating so as to be operatively engaged with the transmission, the combination operates the work performing mechanism.

IN THE DRAWINGS

FIG. 2 is a side view of the extended shaft according FIG. 1 with the power take-off device and hydraulic pump removed for sake of clarity.

DETAILED DESCRIPTION OF CERTAIN EMBODIMENTS

Figure 1:
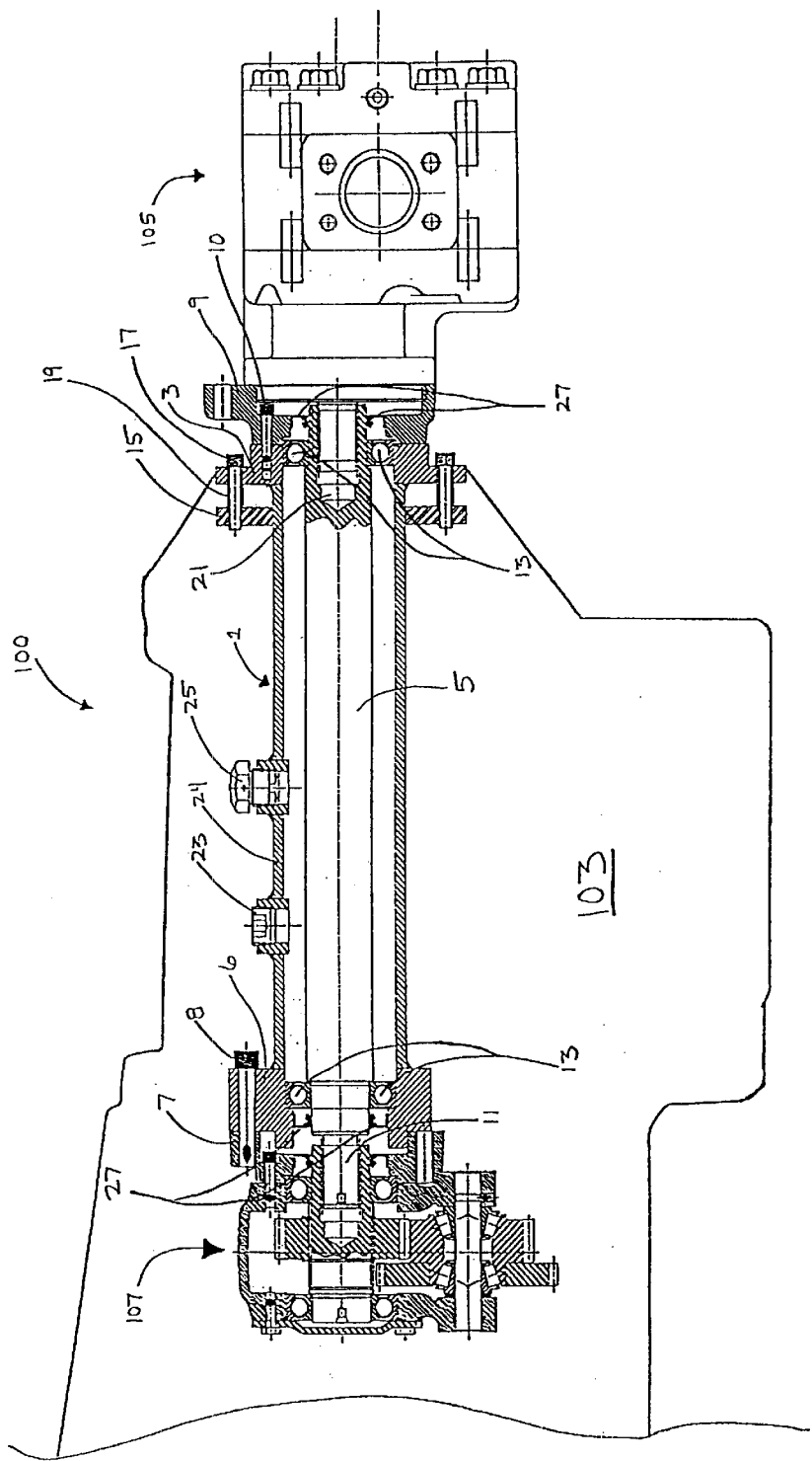
FIG. 1 is a side view of an embodiment of an extended shaft according to this invention, shown mounted to a transmission and coupled to a power take-off device and hydraulic pump, with certain parts illustrated in x-ray.

Referring initially to FIGS. 1 & 2, there is illustrated an extended shaft indicated at 100 as one exemplar embodiment according to the subject invention. Generally speaking, the extended shaft 100 includes a support tube 1 for enclosing a drive shaft 5, an auxiliary device mounting adapter 9 (attached to support tube flange 3), and a power take-off mounting bracket 6, each for mounting the extended shaft 100 to the hydraulic pump 105 and the power take-off device 107 respectively.

More specifically, drive shaft 5 is rotatably supported proximal the center of the inner tubular structure of support tube 1 by bearings 13. Bearings 13, as standard, non-sealed shaft bearings, are located proximal each longitudinal end of support tube 1. They serve to simultaneously support and permit the rotation of drive shaft 5 within the confines of the support tube 1.

Drive shaft 5 is preferably a solid, one piece shaft. In an alternative embodiment, drive shaft 5 may be multiple shafts whose ends abut and are joined by a collar or sleeve. In order to reduce friction as the drive shaft 5 is operated, support tube 1 is filled with a conventional lubricant such as oil or any other suitable lubricant known in the art. The lubricant is conveniently added to support tube 1 via fill port 23 located in the wall 24 of support tube 1. Shaft seals 27 serve to seal the tubular structure and prevent leakage of lubricant therefrom, such seals 27 being located proximal mounting bracket 6 and mounting adapter 9 at each end of support tube 1.

In order to allow for the expansion and contraction of gases within extended shaft 100 during operation and thereby to protect the integrity of shaft seals 27 (by preventing pressure build-up), breather 25 is included and is located in tubular wall 24. Breather 25 may be a conventional breather of known construction which permits passage of air in and out of support tube 1.

Figure 1A:
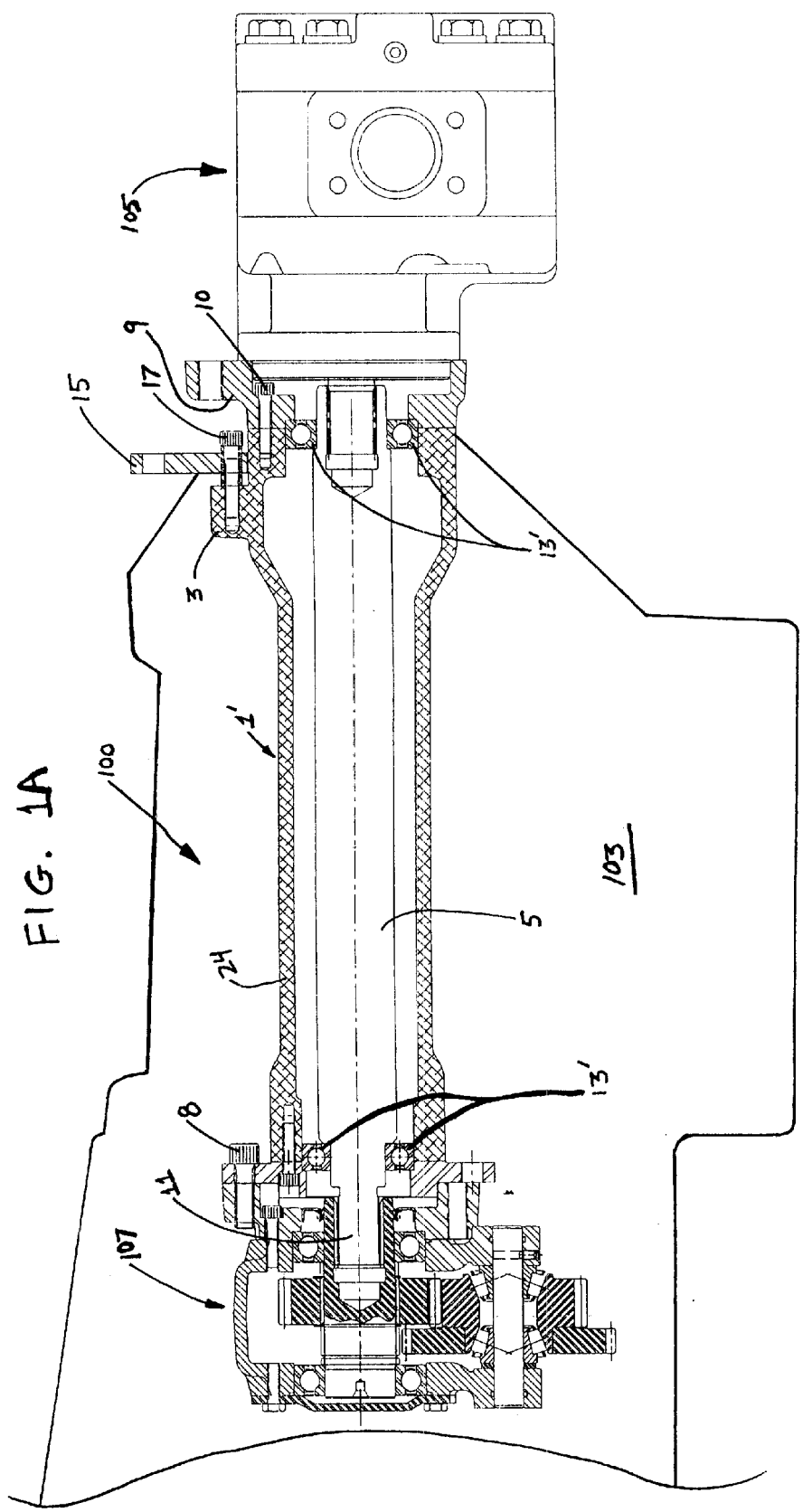
FIG. 1A is a side view of an alternative embodiment of the invention illustrated in FIG. 1.

In an alternative embodiment, illustrated in FIG. 1A, sealed bearings 13' may be employed in place of non-sealed bearings 13. Such bearings 13' are pre-greased within their sealed structure and therefore do not require that support tube 1 be filled with additional lubricant. For this reason, embodiments utilizing such permanently lubricated bearings 13' do not require that fill port 23, shaft seals 27, or breather 25 be employed.

Figure 3:
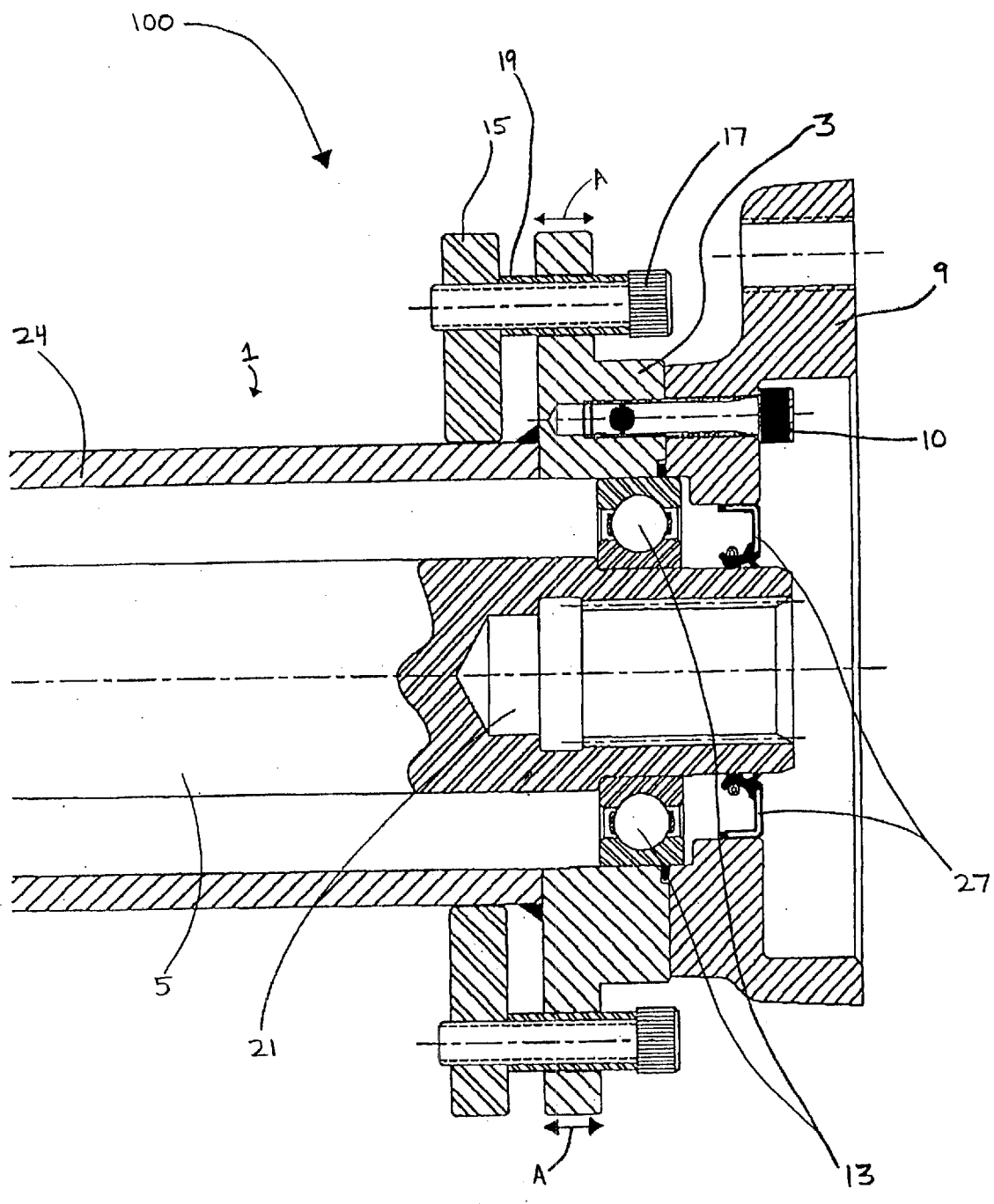
FIG. 3 is an x-ray view of one embodiment of the hydraulic pump and transmission mounting bracketry according to the subject invention.

Referring now to FIGS. 1, but in particular to FIG. 3 as well, extended shaft 100 is mounted to transmission 103 through a series of bracketry assembled through support tube mounting bracket 15 and support tube flange 3 which includes cap screws 17 and spacer sleeves 19. Support tube flange 3 is welded to support tube 1, but may alternatively be an extension of wall 24 of support tube 1. Support tube mounting bracket 15 is fixedly attached to transmission 103 via bolts but may be attached by any other suitable means known in the art. Support tube mounting bracket 15 and support tube flange 3 each provide apertures of sufficient diameter for receipt of the shafts of cap screws 17. The apertures of support tube flange 3 are of further sufficient diameter so as to be capable of receiving spacer sleeves 19 through which cap screws 17 are to be inserted. As assembled, the apertures of support tube flange 3 are in receipt of spacer sleeves 19 which abut the planar surfaces of support tube mounting bracket 15 at the outside peripheries of its apertures. Cap screws 17 are disposed through spacer sleeves 19 (which are disposed through the apertures of the support tube flange 3) and through the apertures of support tube mounting bracket 15 where they are immovably secured.

Referring again to FIG. 1A, an alternative embodiment of extended shaft 100 employs bracketry similar to that described above but mounted in a slightly modified configuration. In particular, support tube mounting bracket 15 is now mounted on the opposite side of support tube flange 3 as compared to the configuration of bracket 15 and flange 3 illustrated in FIG. 1. More specifically, mounting bracket 15 is now mounted on the side of flange 3 which is nearest to hydraulic pump 105. As may further be seen, flange 3, in this embodiment, is integral to (i.e. is cast as part of) support tube 1 rather than provided as a separate part.

In each of the above arrangements, the mounting bracketry, according to the subject invention, will allow for the thermal expansion of the materials. For example, as the system heats up or cools down during or after operation, and the various parts, often of different materials, expand or contract, support tube flange 3 is capable of moving or sliding along spacer sleeves 19 in the directions as indicated by the arrows "A" in FIG. 3. Specifically, this sliding movement allows for differences in length changes in both the (housing of) transmission 103 and extended shaft 100, substantially reducing the amount of stress imparted on the system during and after its operation. This feature is particularly useful when the materials constituting the system have substantially different coefficients of thermal expansion. For example, in conventional practice, the walls of the transmission 103 housing are made of aluminum or an aluminum alloy, whereas the walls of support tube 1 are made of low-carbon steel. In such an arrangement, the coefficient of thermal expansion differs between the two materials by a factor of roughly 2. Therefore, the rates of expansion and contraction of these materials at a given temperature differ significantly.

Certain embodiments, such as illustrated in FIG. 1A, may, of course, employ a support tube 1' which is constructed from the same material(s) as the housing of the transmission 103. In such an embodiment, the coefficients of thermal expansion of the transmission 103 housing and support tube 1' are the same or nearly the same. However, during operation of power take-off device 107 and transmission 103, the housing of the transmission and support tube 1' will be heated to different temperatures. Therefore, thermal expansion and contraction of each will still be inconsistent with respect to each other, and the mounting bracketry of the subject invention will thus still serve an important purpose.

Referring again now to FIG. 1, the mounting arrangement of support tube 1 to hydraulic pump 105 is therein illustrated. Specifically, an auxiliary device mounting adapter 9 is provided which couples support tube flange 3 to the hydraulic pump 105. Support tube flange 3 and auxiliary device mounting adapter 9 both include apertures for receipt of cap screw 10. As assembled, cap screw 10 is inserted through each of the apertures of auxiliary device mounting adapter 9 and support tube flange 3, thereby securing support tube 1 to auxiliary device mounting adapter 9. Hydraulic pump 105 is, of course, mounted to auxiliary device mounting adapter 9 through a similar or other arrangement, effectively connecting support tube 1 to hydraulic pump 105. In this arrangement, the output end 21 of drive shaft 5 is in functional communication with the hydraulic pump 105 in a manner known and conventional in the art.

It is understood, of course, that in an alternative embodiment, any suitable form of driven device may be attached or driven at this output end 21 of the drive shaft 5. For example, a pulley may be connected to supply power to other auxiliary devices that are typically driven by other means (ie. front crankshaft, auxiliary engine, etc.) and which are too large to mount in the envelope (space) otherwise provided.

As further illustrated in FIGS. 1 & 2, extended shaft 100 is mounted to power take-off device 107 via power take-off mounting bracket 6 which is welded to support tube 1 and contains apertures for receipt of cap screw 8. Optionally, power take-off mounting bracket 6 may be a flange type structure extending perpendicular from support tube 1. Power take-off mounting adapter 7, as standard to power take-off device 107, is provided for mounting power take-off device 107 to power take-off mounting bracket 6 and also contains apertures for receipt of cap screw 8.

When assembled, the apertures of power take-off mounting bracket 6 and power take-off mounting adapter 7 are in alignment with cap screw 8 disposed immovably through each. In this arrangement, cap screw 8 secures power take-off mounting bracket 6 to power take-off mounting adapter 7, which is further securely connected to power take-off device 107. This effectively secures support tube 1 to power take-off device 107. In this secured or attached position, drive shaft 5, which has a splined shaft end 11, is in communication with a shaft (not shown for sake of clarity) of power take-off device 107 at its splined end. This connection or intercommunication between splined shaft end 11 and a shaft of power take-off device 107, allows power take-off device 107 to transmit power through drive shaft 5 to hydraulic pump 105.

In an alternative embodiment, extended shaft 100 may be mounted to power take-off device 107 with bracketry similar to that which mounts support tube 1 to transmission 103. In this embodiment, spacer sleeves are included for receipt of cap screw 8. In this arrangement, slip movement of power take-off mounting bracket 6 is possible along these spacer sleeves to allow for thermal expansion or contraction of the relevant parts during the heating and cooling of the materials in the system or simply to accommodate for other stresses experienced during use.

Once given the above disclosure, many other features, modifications, and improvements will become apparent to the skilled artisan. Such other features modifications, and improvements are therefore considered to be part of this invention, the scope of which is to be determined by the following claims:

I claim:

1. In the combination of an engine which operates a work performing mechanism remotely located from said engine wherein said combination includes a transmission operatively connected to said engine and to said work performing mechanism by a power takeoff device connected to said transmission and having a housing and an output shaft connectable to said work performing mechanism for operating said mechanism in a work performing mode, the improvement wherein said combination further includes an extension mechanism for remotely mounting said work performing mechanism a preselected spaced distance from said power takeoff device, said extension mechanism comprising a housing extending across said preselected spaced distance and being connected to said transmission and to said housing of said power takeoff device and further including a shaft located and internally rotatably supported via sealed, lubricated bearings within said housing and extending across said preselected spaced distance from said power takeoff device to said work performing mechanism and being connected at a first end to said output shaft of said power takeoff device and at a second end to said work performing mechanism, whereby when said power takeoff device is operatively connected to said transmission and said engine is operating so as to be operatively engaged with said transmission, said combination operates said work performing mechanism.

2. The combination of claim 1 wherein the coefficient of expansion of a housing of said transmission differs from the coefficient of expansion of said housing of said extension mechanism by a factor of less than 2.

3. The combination of claim 2 wherein said housing of said extension mechanism and said housing of said transmission are constructed of an alloy of the same type.

4. The combination of claim 1 wherein said extension mechanism is connected to said transmission via a combination of bracketry, said combination of bracketry comprising:

a transmission mounting bracket, said transmission mounting bracket including a bracket aperture having a first diameter;

a housing flange located proximal the length of a surface of said housing of said extension mechanism; said housing flange including a housing flange aperture having a second diameter;

a spacer sleeve disposed through said housing flange aperture and abutting a surface of said transmission mounting bracket; and a fastener inserted through said spacer sleeve and fixedly connected at said bracket aperture;

wherein said combination of bracketry provides support to said extension mechanism and permits movement of said housing flange with respect to said transmission mounting bracket.

5. The combination of claim 1 wherein said housing of said extension mechanism includes a housing flange located proximal the length of a surface of said housing of said extension mechanism; and wherein said transmission includes a transmission housing having a transmission mounting bracket fixed thereon; and further including a combination of bracketry for connecting said housing flange to said transmission mounting bracket, wherein said combination of bracketry is so arranged in a manner to connect said housing flange to said transmission mounting bracket such that said combination of bracketry permits movement of said housing flange with respect to said transmission mounting bracket.

6. The combination of claim 1 wherein said extension mechanism is connected to said transmission via a combination of bracketry, said combination of bracketry comprising:

a transmission mounting bracket, said transmission mounting bracket including a bracket aperture having a first diameter;

a housing flange located proximal the length of a surface of said housing; said housing flange including a housing flange aperture having a second diameter;

a spacer sleeve disposed through said bracket aperture and abutting a surface of said housing flange; and a fastener inserted through said spacer sleeve and fixedly connected at said housing flange aperture;

wherein said combination of bracketry provides support to said extension mechanism and permits movement of said housing flange with respect to said transmission mounting bracket.

\* \* \* \* \*